Nov. 17, 1925.
F. G. WHITTINGTON
VEHICLE SEARCHLIGHT
Filed Sept. 1, 1922
1,561,625
2 Sheets-Sheet 1
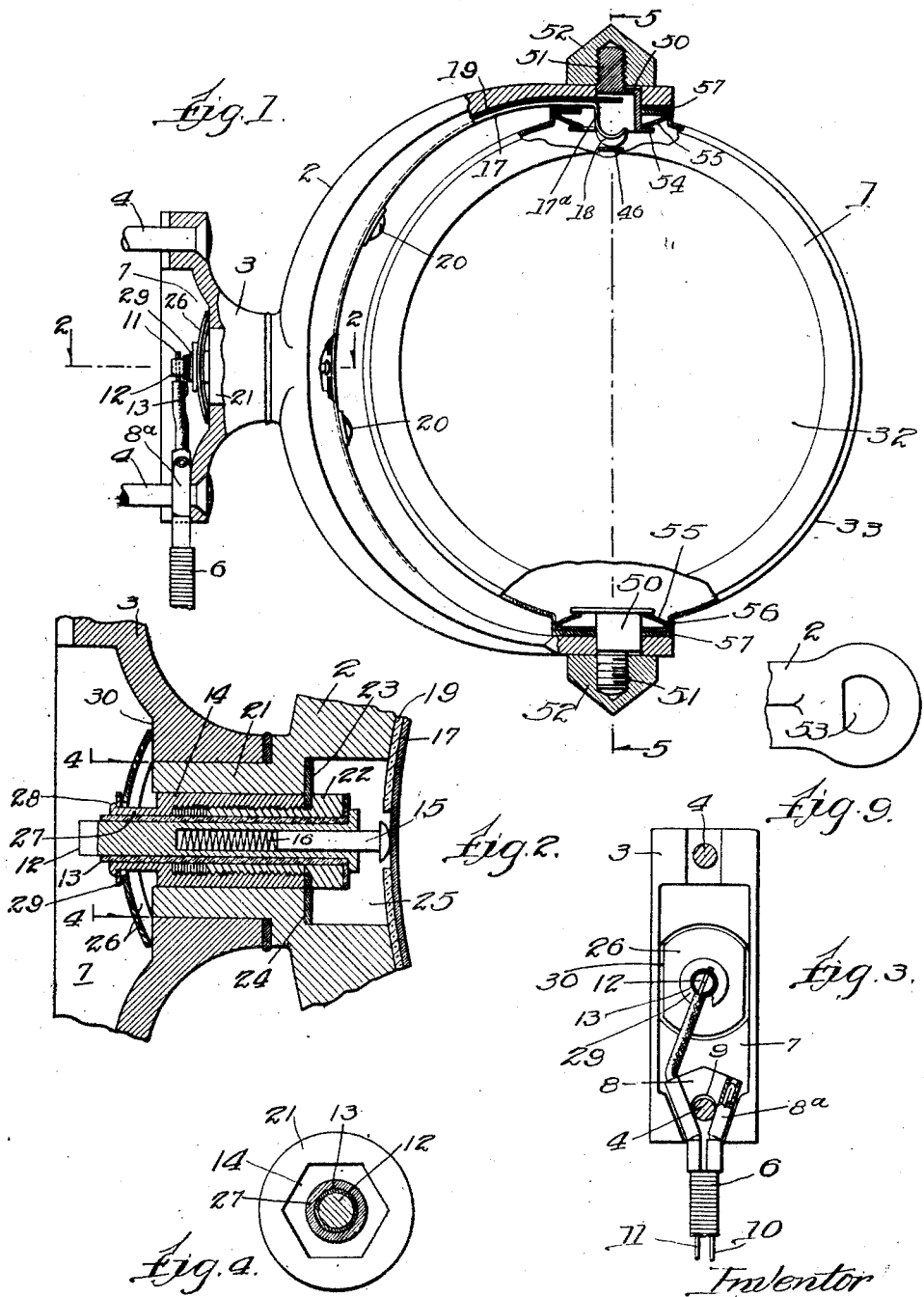

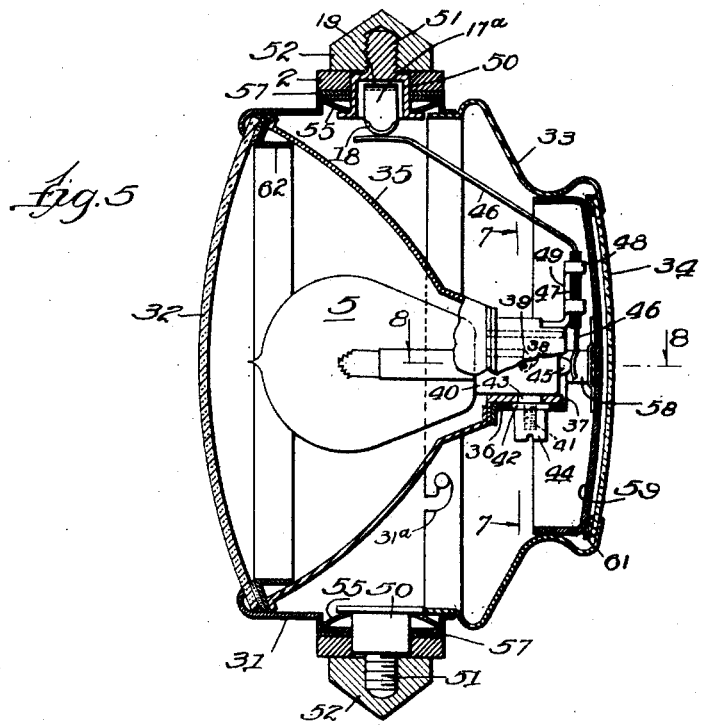
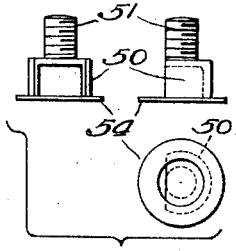
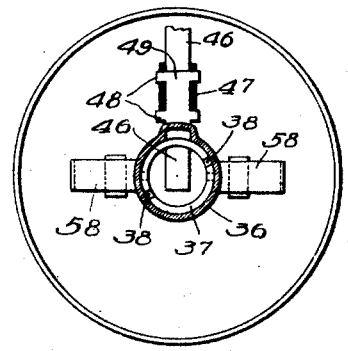
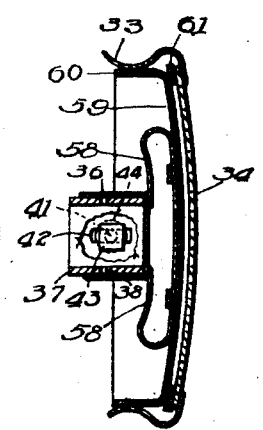

Patented Nov. 17, 1925.

1,561,625

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

VEHICLE SEARCHLIGHT.

Application filed September 1, 1922. Serial No. 585,582.

*To all whom it may concern:*

Be it known that I, FREDERIK G. WHITTINGTON, a citizen of the United States, residing in Evanston, in the county of Cook and State of Illinois, have invented certain new and useful Improvements in Vehicle Searchlights, of which the following is a specification, reference being had to the accompanying drawings, forming a part thereof.

The purpose of this invention is to provide an improved construction for a vehicle searchlight of the type in which an electric lamp is employed with a concentrating reflector and the searchlight body or casing is adjustably mounted to permit projecting the beam of light in any direction at will. It consists of various features and elements of construction hereinafter described and shown in the drawings as indicated by the claims.

In the drawings:

Figure 1 is a front elevation of a searchlight embodying this invention with certain parts broken away and shown in section.

Figure 2 is an enlarged detail section taken as indicated at line 2—2 on Figure 1.

Figure 3 is a rear elevation or under side view of the mounting bracket and base.

Figure 4 is a detail section taken as indicated at line 4—4 on Figure 2.

Figure 5 is a vertical axial section through the casing and its swivel mounting being taken as indicated at line 5—5 on Figure 1.

Figure 6 is a group of detail views (side, front and bottom plan views) of the trunnion employed for swiveling the lamp body.

Figure 7 is an interior sectional view taken as indicated at line 7—7 on Figure 5.

Figure 8 is a transverse section taken as indicated at line 8—8 on Figure 5.

Figure 9 is a detail view showing the outer face of one end of a bail or bracket which carries the lamp shell.

The searchlight to which this invention is shown as applied comprises a lamp body or casing, 1, carried by a two-armed bail or bracket, 2, which is rotatably mounted in a base, 3, designed to be secured as by mounting screws, 4, to any convenient post or panel of an automobile body within reach of the driver's seat.

Within the casing, 1, there is carried an incandescent electric lamp bulb, 5, and one object of this invention is to eliminate the usual loose electrical wiring which ordinarily depends from the lamp casing; instead, the present arrangement provides in-built electrical connections in the supporting bail, 2, and base, 3, which maintain the electric circuit for the lamp throughout the range of pivotal adjustment of the lamp casing, 1, in the bail, 2, and upon the base, 3. A two-wire cable enclosed in a conduit, 6, leads from any suitable source of current,—preferably with a switch interposed in the circuit within convenient reach of the driver,—and enters a recess, 7, in the base, 3, at which point a re-inforcing clip, 8, is secured to the end of the conduit, 6, and fixed in the base by engagement of its aperture, 9, with one of the securing screws, 4. One side of the lamp circuit is "grounded" through the lamp-supporting means and casing of the searchlight; therefore one of the lead wires, 10, is grounded to the clip, 8, by doubling and wedging its end portion within the tubular guide, 8$^a$, of the clip. The other lead wire, 11, is led through the other guide, 8$^b$, with its insulation intact and is connected to a slotted conductor pin, 12, by pinching the latter tightly upon the end of the lead wire as it lies in the slot at the end of said pin. Said pin, 12, is axially and rotatably carried in an insulating bushing, 13, in the two-part tie bolt, 14, which holds together the base, 3, and the bail, 2. At the end of the pin, 12, opposite its connection to the conductor wire 11, it is bored to receive a contact plunger, 15, with a follower spring, 16, pocketed behind it in the pin, 12. The head of said plunger, 15, maintains electrical contact with a conductor strip, 17, mounted on the inner or concave face of the bail, 2, and extending along one arm of the bail to the swivel mounting of the lamp body, 1, where said conductor strip terminates in a convexly formed end, 18. Preferably the strip, 17, is lodged in the groove formed in the bail, 2, and separated from the metallic surface by a strip of insulating material, 19. Securing screws, 20, are shown in Figure 1.

The bail or bracket, 2, is formed with an integral hollow stem, 21, rotatively fitted into a suitable bore in the base, 3. The inner threaded member, 22, of the two-part bolt, 14, is formed with a head which overlaps a washer, 23, and clamps it against the end of the outer member of the bolt as seen in Figure 2, and said washer bears against a shoulder, 24, formed in the bracket, 2, and constituting the bottom of the recess, 25, in which the contact plunger, 15, projects for engagement with the conductor, 17. At the other end of the bolt, 14, a spring washer, 26, is fitted loosely over the reduced end portion, 27, of the bolt, 14, and the extreme end, 28, is flanged over this, rivet fashion, with a small washer, 29, interposed to retain the spring washer, 26. Said spring washer bears upon the wall, 30, of the recess, 7, in the base, 3, and thus cooperates with the washer, 23, for locking together the base and the bail.

The lamp casing consists of a substantially cylindrical shell, 31, with a cover glass, 32, secured at one end and a rear cover member, 33, telescoped into it and locked by any convenient means such as the well known bayonet lock, 31ª. If desired the rear cover may carry the rear view mirror indicated at 34. Within the shell, 31, a reflector, 35, supports at its center a guide tube, 36, in which is slidably mounted a lamp socket tube, 37, having the usual bayonet lock notches, 38, to receive the locking pins, 39, of a standard miniature lamp base, 40, of the lamp, 5. For focusing the lamp the socket tube, 37, may be adjusted in the direction of its axis within the guide tube, 36; a locking screw, 41, is lodged in a slot, 42, with its square head, 43, overlapping said slot within the tube, 36, and accommodated in a close fitting aperture in the socket tube, 37, so that the screw will move in the slot, 42, when the socket tube is adjusted therein. When correct position of the lamp is obtained, the nut, 44, on the screw, 41, is tightened against the outer surface of the tube, 36, to retain the parts.

The lamp base, 40, as shown is of the familiar center contact type in which one side of the circuit is connected through the cylindrical base shell, 40, and the socket which holds it while the other circuit lead consists of a contact point, 45, protruding from the end of the base. This point engages a spring contact member, 46, supported in an insulating covering, 47, embraced by clips, 48, of an angle arm, 49, upstanding from the guide tube, 36, as seen in Figures 5 and 7. Beyond the insulation, 47, the arm, 46, is bent and extends directly into contact with the convex terminal, 18, of the conductor strip, 17.

The body, 31, is swiveled in the bail, 2, upon trunnions, 50, which for convenience are both alike though their special construction is especially adapted for accommodation of the conductor, 17, and its terminal portion, 18. Each trunnion has a threaded stem, 51, projecting through the bail, 2, to receive a clamping nut, 52; the hollow body portion of the trunnion is of generally cylindrical form but with one side flattened forming a rectangular opening through which the end portion of the conductor, 17, enters said hollow body of the trunnion. The conductor is bent at 17ª to extend in the direction of the trunnion axis and then terminates in the convexly rounded contact tip, 18. The non-circular openings, 53, in the arms of the bail, 2, closely fitting the hollow body portions of the trunnions, 50, hold them against rotation in the bail so that the opening at one side of the trunnion body bears a fixed relation to the conductor, 17, entering therethrough. At its inner end the hollow trunnion body opens into the cavity of the lamp shell, 31, and is flanged at 54 to engage a spring washer, 55, which bears in the hollow boss, 56, of the lamp shell to lock it to the bail. Preferably washers, 57, are interposed between the outer surface of the bosses, 56, and the arms of the bail, 2,—the spring washers, 55, being relied upon to supply sufficient friction for holding the lamp body in any position of adjustment upon its swivel axis. Throughout such adjustment the convex contact terminal, 18, of the conductor, 17, being positioned at said axis maintains the electrical connection with the conductor arm, 46, and thence with the lamp, 5.

For positioning the reflector, 35, firmly in the shell, 31, a pair of spring arms, 58, are mounted on the inner surface, 59, of a flanged diaphragm, 60, which is forced into position in the back cover, 33, just inside the mirror, 34. Preferably by its pressure against a cushion ring, 61, said diaphragm holds the mirror in position and the spring arms, 58, pressing in the opposite direction against the end of the socket guide tube, 36, serve to hold the forward edge of the reflector against the bezel ring, 62, which in turn retains the front cover glass, 32. Thus the lamp, 5, is rendered readily accessible for renewal because upon disengaging the rear cover, 33, from the shell, 31, the reflector, 35, and the socket assembly may be lifted out of the shell and as readily returned to position after replacement of the lamp bulb, 5.

I claim:

1. A vehicle searchlight comprising a trunnioned body and a bail for carrying it by engagement with its trunnions, the bail having a stem; a base in which the stem is journaled for swiveling the bail to the base; a circuit wire entering the base; a thrust member extending insulated through the stem of the bail, with the said circuit wire connected to the outer end thereof; a contact strip insulated in the bail extending from the stem around to one trunnion bearing; means holding the inner end of said thrust member in contact with said strip; a lamp socket in the body; and a circuit member mounted insulated in the body having one end positioned for contact with one of the lamp contacts and the other end positioned for contact with the contact strip of the bail at the trunnion.

2. In the construction defined in claim 1 foregoing, the thrust member comprising a threadless bolt or pin axially bored and flanged to form a head at one end, and a plunger spring-seated in the bore and protruding therefrom for yielding thrust against the contact strip of the bail.

3. In the construction defined in claim 1 foregoing, the trunnion to which the bail contact strip extends being hollow and laterally apertured from the inner end for entrance of the contact strip therethrough and emergence therefrom, to make the contact described.

4. A vehicle searchlight comprising in combination with a base member, a lamp body and a carrying arm for the latter having a stem, the base comprising a journal bearing for the stem and having a cavity forming a shoulder around the journal bearing at the inner end thereof, the carrying arm having a cavity co-axial with the stem at the root of the latter, locking means comprising a two-member bolt, one of whose members is axially bored and internally threaded at one end and at the other end exteriorly reduced to form a head and exteriorly threaded at the reduced part for screwing into the internally threaded bore of the first member; a washer engaged between the head of the second member and the bored end of the first member, said first member having its opposite end reduced in diameter, a concavo-convex spring washer entered on said reduced end and means for retaining said washer thereon, said spring washer being diametered for seating at its outer circumference on the shoulder of the base.

5. In the construction defined in claim 4, foregoing, the cavity in the base being oblong and the washer being similarly oblong for lodging non-rotatably in the cavity; whereby the stem of the carrier turns on the spring washer in the swiveling of the carrier on the base.

6. In the construction defined in claim 1 foregoing, the body having bosses mounted rotatably on the trunnions, said trunnions being engaged non-rotatably with the bail.

7. In the construction defined in claim 1 foregoing, the body having bosses in which the trunnions are mounted, the trunnions having flanged inner ends forming heads and being reduced in diameter and threaded at their outer ends and being mounted with clearance between their heads and the body bosses; spring washers interposed under the flange heads of the trunnions for yieldingly retracting them and nuts on their threaded ends adapted to be set up against the outer sides of the bail for yieldingly clamping the bail between the nuts and the body bosses in which the trunnions are mounted.

In testimony whereof I have hereunto set my hand at Chicago, Illinois, 29 day of August, 1922.

FREDERIK G. WHITTINGTON.